US011988157B2

(12) United States Patent
Mochrie et al.

(10) Patent No.: US 11,988,157 B2
(45) Date of Patent: May 21, 2024

(54) GAS TURBINE ENGINE WITH A FUEL MANAGEMENT SYSTEM

(71) Applicant: ROLLS-ROYCE plc, London (GB)

(72) Inventors: Richard G Mochrie, Guildford (GB); Graeme E F Sutcliffe, Derby (GB); Jade Whittle, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/166,268

(22) Filed: Feb. 8, 2023

(65) Prior Publication Data

US 2023/0279815 A1 Sep. 7, 2023

(30) Foreign Application Priority Data

Mar. 3, 2022 (GB) .................................... 2202947

(51) Int. Cl.
| | |
|---|---|
| F02C 7/14 | (2006.01) |
| F02C 7/22 | (2006.01) |
| F02C 7/224 | (2006.01) |
| F02C 9/26 | (2006.01) |

(52) U.S. Cl.
CPC .................. *F02C 9/26* (2013.01); *F02C 7/14* (2013.01); *F02C 7/22* (2013.01); *F02C 7/224* (2013.01); *F05D 2220/32* (2013.01); *F05D 2240/35* (2013.01); *F05D 2260/213* (2013.01)

(58) Field of Classification Search
CPC .................................. F02C 7/22; F02C 7/224
See application file for complete search history.

(56) References Cited

U.S. PATENT DOCUMENTS

| | | | |
|---|---|---|---|
| 3,486,458 | A | 12/1969 | Tyler |
| 3,779,007 | A | 12/1973 | Lavash |
| 5,116,362 | A | 5/1992 | Arline et al. |
| 6,182,435 | B1 | 2/2001 | Niggemann et al. |
| 6,981,359 | B2 | 1/2006 | Wernberg et al. |
| 7,185,485 | B2 | 3/2007 | Lewis |

(Continued)

FOREIGN PATENT DOCUMENTS

| | | | | |
|---|---|---|---|---|
| FR | 2992306 | A1 * | 12/2013 | ............. B64D 37/16 |
| GB | 1194041 | A | 6/1970 | |
| GB | 2 289 722 | A | 11/1995 | |

OTHER PUBLICATIONS

English translation of FR 2992306 A1 (Year: 2013).*

(Continued)

*Primary Examiner* — Scott J Walthour
(74) *Attorney, Agent, or Firm* — Oliff PLC

(57) ABSTRACT

A gas turbine engine comprising a combustor and a fuel management system. The fuel management system comprises a fuel supply line, recirculation line and heat exchanger. The fuel supply line is configured to supply fuel to the combustor. The recirculation line is configured to recirculate excess fuel from the fuel supply line to an engine-located fuel tank via a fuel cooling device. The fuel cooling device is configured to reject heat from the excess fuel in the recirculation line. The heat exchanger is configured to reject heat from a thermal load of the gas turbine engine to fuel in the fuel management system. The heat exchanger is disposed on the fuel supply line or on the recirculation line. The fuel supply line is configured to receive fuel from an external source and from the engine-located fuel tank.

16 Claims, 4 Drawing Sheets

(56) References Cited

U.S. PATENT DOCUMENTS

| | | | |
|---|---|---|---|
| 8,925,322 | B2 | 1/2015 | Scully et al. |
| 10,752,374 | B1 | 8/2020 | Lui et al. |
| 11,560,239 | B2 | 1/2023 | Rambo et al. |
| 2003/0074884 | A1 | 4/2003 | Snow et al. |
| 2012/0297780 | A1 | 11/2012 | Bruno et al. |
| 2012/0312037 | A1 | 12/2012 | Finney et al. |
| 2016/0230669 | A1 | 8/2016 | Selstad et al. |
| 2016/0281656 | A1 | 9/2016 | Alecu et al. |
| 2018/0155046 | A1* | 6/2018 | Bowman ............. B64D 37/005 |
| 2019/0277201 | A1 | 9/2019 | Veilleux, Jr. et al. |
| 2021/0229827 | A1 | 7/2021 | Doman |
| 2022/0106052 | A1* | 4/2022 | Snyder ................. B64D 33/10 |

OTHER PUBLICATIONS

Jul. 10, 2023 extended Search Report issued in European Patent Application No. 23155255.5.

Jul. 10, 2023 extended Search Report issued in European Patent Application No. 23155253.0.

Jul. 10, 2023 extended Search Report issued in European Patent Application No. 23155251.4.

Jul. 10, 2023 extended Search Report issued in European Patent Application No. 23155250.6.

Sep. 30, 2022 Search Report issued in European Patent Application No. GB2206111.3.

Aug. 22, 2022 Search Report issued in European Patent Application No. GB2202948.2.

Aug. 22, 2022 Search Report issued in European Application No. GB2202947.4.

Jul. 28, 2022 Search Report issued in European Patent Application No. GB2202946.6.

U.S. Appl. No. 18/166,308, filed Feb. 8, 2023 on behalf of Richard G Mochrie.

U.S. Appl. No. 18/166,253, filed Feb. 8, 2023 on behalf of Richard G Mochrie.

U.S. Appl. No. 18/166,285, filed Feb. 8, 2023 on behalf of Richard G Mochrie.

Nov. 16, 2023 Office Action issued in U.S. Appl. No. 18/166,285.

Jan. 22, 2024 Notice of Allowance issued in U.S. Appl. No. 18/166,285.

Feb. 29, 2024 Office Action issued U.S. Appl. No. 18/166,253.

\* cited by examiner

GAS TURBINE ENGINE WITH A FUEL MANAGEMENT SYSTEM

This disclosure claims the benefit of UK Patent Application No. GB 2202947.4, filed on 3 Mar. 2022, which is hereby incorporated herein in its entirety.

TECHNICAL FIELD

The present disclosure relates to a gas turbine engine comprising a fuel management system. It relates further to an aircraft comprising a fuel management system.

BACKGROUND

Fuel management systems are conventionally used for providing fuel to a gas turbine engine and for management of thermal loads. Fuel can be used as a heat sink into which heat from the thermal loads may be rejected prior to the fuel being provided to a combustor or a reheat of a gas turbine engine. Heat exchange apparatus is typically provided for the purpose of facilitating heat rejection from the thermal loads into the fuel within a fuel management system.

Known fuel management systems can be complex in nature, with a large mass or installation volume. It is therefore desirable to provide an improved fuel management system.

SUMMARY

According to a first aspect of the present disclosure, there is provided a gas turbine engine comprising a combustor and a fuel management system, the fuel management system comprising: a fuel supply line configured to supply fuel to the combustor; a recirculation line configured to recirculate excess fuel from the fuel supply line to an engine-located fuel tank via a fuel cooling device configured to reject heat from the excess fuel; and a heat exchanger configured to reject heat from a thermal load of the gas turbine engine to fuel in the fuel management system, wherein the heat exchanger is disposed on the fuel supply line or on the recirculation line; wherein the fuel supply line is configured to receive fuel from an external source and from the engine-located fuel tank.

It may be that the gas turbine engine further comprises a combustor valve on the fuel supply line configured to control flow of a burn portion of fuel passing through the combustor valve to the combustor, wherein the combustor valve is disposed on the supply line so that a remaining portion of fuel flowing in the supply line is directed into the recirculation line.

The gas turbine engine may further comprise a burn controller configured to: receive a burn signal relating to a fuel demand of the combustor; and control the combustor valve to meet the fuel demand based on the burn signal. The gas turbine engine may further comprise a burn flow sensor configured to monitor a burn flow rate of the burn portion of fuel. The burn controller is configured to control the combustor valve to meet the fuel demand based on the monitored burn flow rate.

It may be that the gas turbine engine further comprises a fuel flow controller configured to: receive a cooling signal relating to a cooling demand of the thermal load; control fuel flow in the fuel management system based on the cooling signal to meet the cooling demand. The thermal load may comprise a process flow circuit configured to reject heat from a process fluid to fuel within the heat exchanger; and the cooling signal may relate to a temperature of the process fluid at a temperature monitoring location of the process flow circuit.

The fuel flow controller may be further configured to receive a burn signal relating to a fuel demand of the combustor; and wherein the fuel flow controller is configured so that the control of the fuel flow in the fuel management system is based on at least the cooling signal and the burn signal to meet the cooling demand and the fuel demand, and wherein control of fuel flow in the fuel management system includes controlling the combustor valve. The gas turbine engine may further comprise a combustor flow sensor configured to monitor a burn flow rate of the burn portion of fuel; wherein the fuel flow controller is configured so that the control of the fuel flow in the fuel management system to meet the fuel demand is based on the monitored burn flow rate.

It may be that the gas turbine engine further comprises a fuel pump on the fuel supply line, wherein the fuel flow controller is configured so that the control of the fuel flow in the fuel management system includes controlling the fuel pump. In addition, the gas turbine engine may further comprise an input control valve configured to control mixing of fuel received into the fuel supply line from the external source and from the engine-located fuel tank. The fuel flow controller may be configured so that the control of the fuel flow in the fuel management system to meet the cooling demand includes controlling the input control valve to vary mixing of fuel received into the fuel supply line from the external source and from the engine-located fuel tank.

For example, it may be that the fuel flow controller is configured to vary flow rates of fuel received into the fuel supply line from the external source and from the engine-located fuel tank based on a monitored temperature of fuel in the fuel management system upstream of the heat exchanger to meet the cooling demand. The fuel flow controller may receive a signal relating to a temperature of fuel in the fuel supply line and may control the ratio based on the temperature of fuel in the fuel supply line to meet the cooling demand. Additionally, or alternatively, the fuel flow controller may receive signals relating to temperatures of fuel from the external source and fuel from the engine-located fuel tank and may control the ratio based on the respective temperatures to meet the cooling demand.

It may be that the gas turbine engine further comprises a sensor configured to monitor a fill parameter relating to a quantity of fuel stored in the engine-located fuel tank, wherein the fuel flow controller is configured so that the control of the fuel flow in the fuel management system includes controlling the fuel pump and the combustor valve based on the monitored fill parameter to target a target fill parameter while continuing to meet the cooling demand.

It may also be that the gas turbine engine further comprises: a tank bypass line configured to receive fuel from the fuel cooling device and bypass the engine-located fuel tank; and a bypass controller configured to control a tank bypass valve provided to the tank bypass line so as to vary a tank bypass flow rate of fuel received from the fuel cooling device and bypassing the engine-located fuel tank based on the monitored fill parameter; wherein the fuel supply line is configured to receive fuel from: the external source and the recirculation line, and to selectively receive fuel from the engine-located fuel tank via the recirculation line.

The fuel flow controller may comprise the bypass controller, and the fuel flow controller may control the tank bypass valve to vary the tank flow rate depending on the cooling demand of the thermal load. For example, it may be that fuel received from the ram air heat exchanger is at a different temperature to fuel contained in the engine-located fuel tank (e.g. at a cooler temperature), such that by controlling the flow rate of the tank bypass flow, a temperature of fuel received into the fuel supply line can be varied to meet the cooling demand.

The gas turbine engine may further comprise: a reheat fuel supply line extending from the recirculation line to a reheat of the gas turbine engine to extract a reheat portion of fuel; and a reheat controller configured to control a reheat supply valve on the reheat fuel supply line to control a flow rate of the reheat portion of fuel supplied to the reheat based on a reheat signal relating to a fuel demand of the reheat.

Additionally, the gas turbine engine may further comprise a reheat flow sensor configured to monitor a flow rate of the reheat portion of fuel. The reheat controller may be configured to control the reheat supply valve to meet the reheat fuel demand based on the monitored reheat flow rate.

It may be that the fuel flow controller comprises the reheat controller and is configured so that the control of the fuel flow in the fuel management system is to meet the cooling demand of the thermal load, the fuel demand of the combustor, and the fuel demand of the reheat.

According to a second aspect of the present disclosure, there is provided an aircraft comprising a gas turbine engine in accordance with the first aspect and an airframe, wherein the airframe comprises an airframe-located fuel tank which provides the external source for the fuel supply line. It may be that a fuel capacity of the airframe-located fuel tank is equal to or greater than a fuel capacity of the engine-located fuel tank.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. According to an aspect, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
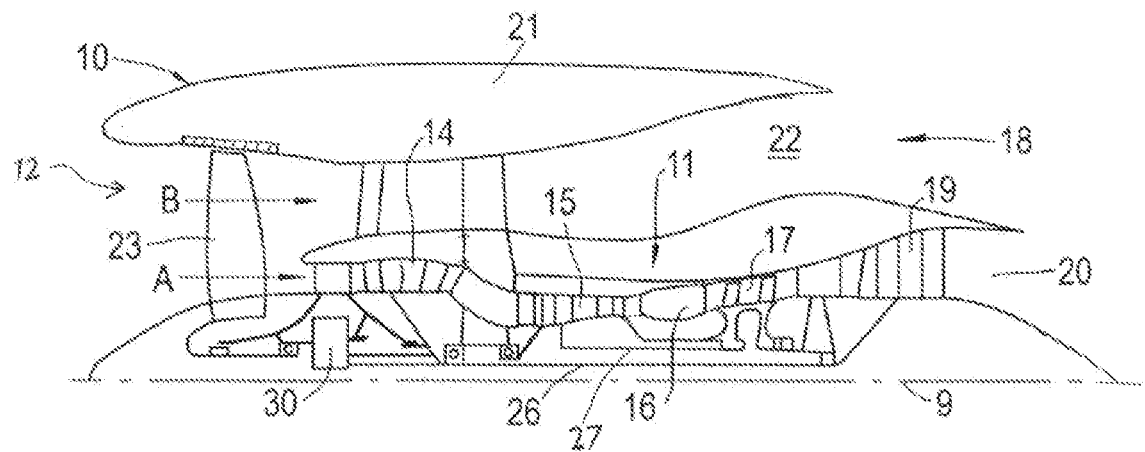
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustor 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
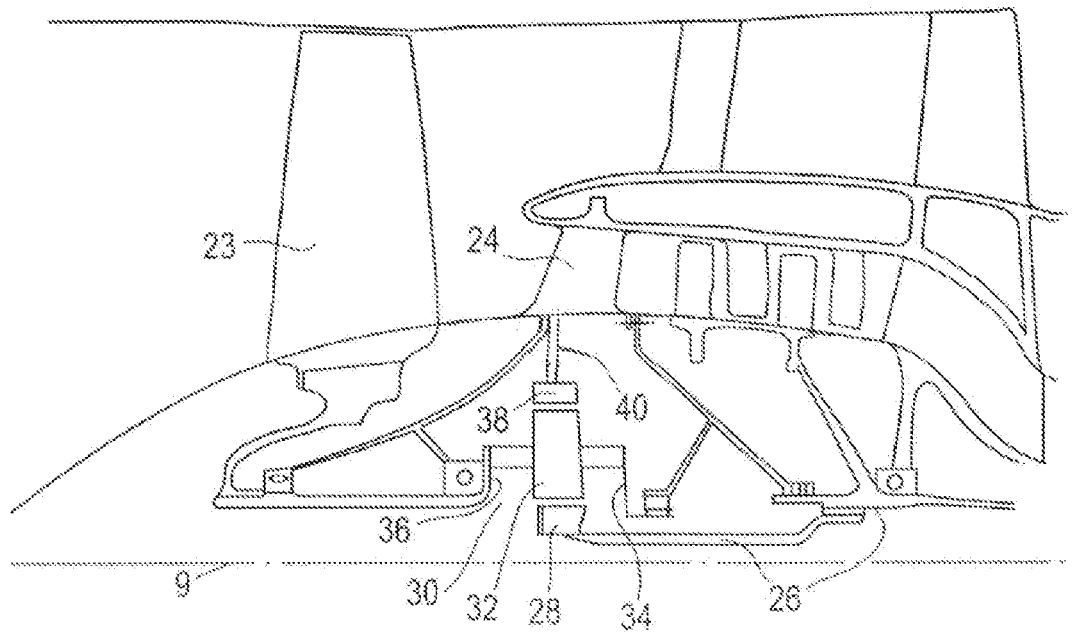
FIG. 2 shows a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
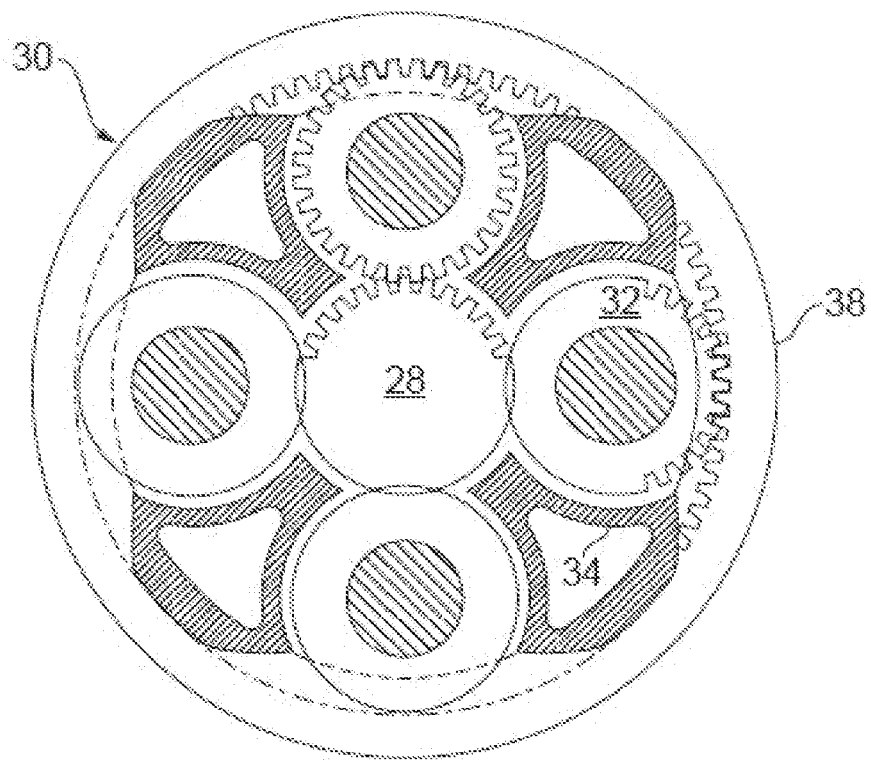
FIG. 3 shows a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
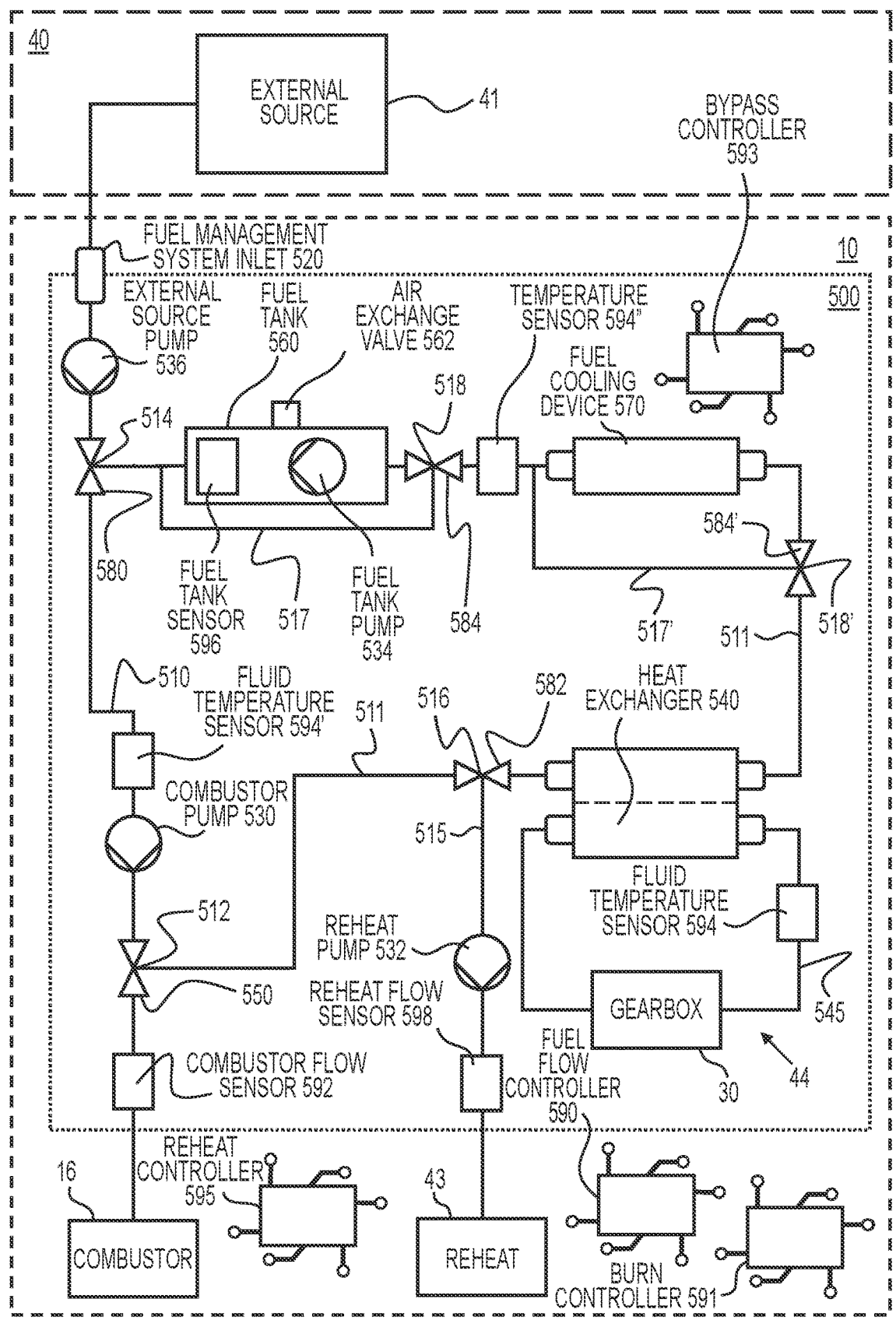
FIG. 4 shows a schematic view of an example gas turbine engine comprising a fuel management system according to the present disclosure.

FIG. 4 shows a schematic view of an example gas turbine engine 10 comprising a fuel management system 500 according to the present disclosure. In the example of FIG. 4, the gas turbine engine further comprises a combustor 16 and a reheat 43. However, it will be appreciated that in variants of the example there may be no reheat 43.

The fuel management system 500 comprises a fuel supply line 510 configured to receive fuel from an external source 41 via a fuel management system inlet 520 and to supply fuel to the combustor 16 of the gas turbine engine. The external source may comprise, for example a fuel tank of an airframe 40. The fuel management system 500 further comprises a recirculation line 511 configured to recirculate excess fuel (i.e. an excess portion of fuel) from the fuel supply line 510 to an engine-located fuel tank 560 via a fuel cooling device 570. The fuel cooling device 570 is generally configured to reject heat from the excess fuel in the recirculation line 511 to a heat sink.

The recirculation line 511 extends from a recirculation point 512 on the fuel supply line 510 to the engine-located fuel tank 560, as will be described further below. From the engine-located fuel tank 560, the recirculation line 511 extends back to the fuel supply line 510 to provide fuel into the supply line 510 at a mixing point 514. The fuel cooling device 570 is configured to reject heat from the excess fuel in the recirculation line 511. As an example, the fuel cooling device 570 may be provided by a ram-air heat exchanger 570 configured to reject heat from the excess fuel to ram air provided thereto such that the ram-air serves as the heat sink. The ram-air heat exchanger 570 may be disposed within a ram-air duct of the gas turbine engine 10. As another example, the fuel cooling device 570 may be provided by an evaporator 570 of a refrigeration circuit. The refrigeration circuit may in turn reject heat via a condenser to ambient air (e.g. ram-air) or via the condenser to fuel at another location within the fuel management system 500 such that the fuel at the other location serves as the heat sink. Other apparatus which may provide the fuel cooling device 570 will be apparent to those skilled in the art.

The fuel management system 500 further comprises a heat exchanger 540 configured to reject heat from a thermal load 44 of the gas turbine engine 10 to fuel in the fuel management system 500. In the example of FIG. 4, the heat exchanger 540 is disposed on the recirculation line 511 upstream of the engine-located fuel tank 560. The heat exchanger 540 is therefore configured to reject heat from the thermal load 44 of the gas turbine engine 10 to fuel in the recirculation line 511.

However, in other examples, it may be that the heat exchanger 540 is disposed elsewhere, such as on the fuel supply line 510 at a location between the mixing point 514 and the recirculation point 512.

The fuel management system 500 is configured to supply fuel from the system inlet 520 and/or from the mixing point 514 to the engine-located fuel tank 560 via the heat exchanger 540 and the fuel cooling device 570 such that fuel provided to the engine-located collector tank 560 has cooled the thermal load 44 (i.e. received rejected heat from the thermal load) within the heat exchanger 540, and subsequently been cooled itself by rejecting heat at the fuel cooling device 570.

Fuel flow within the fuel management system 500 may be maintained and controlled using various example devices shown in FIG. 4 and described below.

The fuel management system 500 may comprise a combustor valve 550 configured to control flow of a burn portion of fuel from the fuel supply line 510 to the combustor 16. References herein to a portion of fuel should be understood as referring to a flow rate of fuel, which in turn constitute a portion of a total flow rate of fuel in the fuel supply line 510 of the fuel management system 500 (e.g. between the mixing point 514 and the recirculation line).

The burn portion of fuel is a portion of the total flow of fuel within the fuel supply line 510 between the input mixing point 514 and the recirculation point 512 which is passed to the combustor 16 for combustion therein. The excess portion of fuel is a remaining portion of the total flow of fuel which is not passed to the combustor 16 for combustion therein. Instead, the excess portion of fuel is recirculated by the recirculation line 511. Accordingly, in this example the combustor valve 550 is configured to direct the excess portion of fuel from the fuel supply line 510 into the recirculation line 511. In the example of FIG. 4, the recirculation point 512 is located at the combustor valve 550, but in other examples the recirculation point 512 may be between the mixing point 514 and the combustor valve 550, or preferably between a pump on the fuel supply line (such as the fuel pump 530 described below) and the combustor valve 550.

It may be that the combustor valve 550 comprises a two-port valve which is configured to restrict the flow of fuel passing to the combustor 16, such that the remaining excess portion of fuel is directed into the recirculation line 511 at some upstream recirculation point. Otherwise, it may be that the combustor valve 550 comprises a three-way valve which is configured to receive fuel from the supply line 510 and to selectively direct fuel into the recirculation line 511 and to pass fuel to the combustor 16, as shown in the example of FIG. 4.

As noted above, the fuel supply line 510 is configured to receive fuel from the engine-located fuel tank 560, at the mixing point 514 and via the recirculation line 511. The fuel management system 500 is configured to mix fuel received from the external source 41 and the engine-located fuel tank 560 at a mixing point 514 on the fuel supply line 510 such that the fuel supply line 510 is configured to receive fuel from the external source 41 and the engine-located fuel tank 560 (or selectively from only one of these, depending on an operating mode of the fuel management system). In the example of FIG. 4, the fuel management system 500 further comprises an input control valve 580 at the fuel mixing point 514, the input control valve 580 being configured to control mixing of fuel received into the fuel supply line 510 from the external source 41 and from the engine-located fuel tank 560. The input control valve 580 may be a three-way valve, for example.

In the example of FIG. 4, the fuel management system 500 comprises a fuel pump 530 located on the fuel supply line 510 between the mixing point 514 and the recirculation point 512 such that the total flow rate of fuel in the fuel supply line is controllable by control of the fuel pump 530. The fuel pump 530 may be further configured to increase a pressure of fuel within the fuel supply line 510 and thereby pressurise fuel to a delivery pressure for the combustor 16.

The total flow rate fuel in the fuel supply line may be dependent on a cooling demand of the thermal load 44 and/or a fuel demand of the combustor 16. For example, the cooling demand of the thermal load 44 may require that the flow rate of fuel is increased to increase heat transfer at the heat exchanger 540, independently of any variation in the fuel demand of the combustor 16. Separately, the fuel demand of the combustor 16 may require the total flow of fuel in the fuel supply line to be increased such that the combustor 16 can be supplied with a flow rate of fuel which is sufficient to operate the combustor 16 at an operational setpoint thereof (the burn flow rate). Such an increase may be required, for example, when there is a relatively large fuel demand of the combustor 16 together with a relatively small cooling demand of the thermal load 44.

The cooling demand of the thermal load 44 corresponds to a flow rate of fuel which is required to be passed through the heat exchanger 540 in order to provide a sufficient rate of heat rejection from the thermal load 44 to the fuel at the heat exchanger 540. The cooling demand of the thermal load 44 is dependent on a thermal dissipation rate of the thermal load 44. The thermal dissipation rate of the thermal load 44 may vary continuously and/or discretely while the fuel management system 500 is in use, and so the cooling demand of the thermal load 44 may vary continuously and/or discretely while the fuel management system 500 is in use. It may be that the thermal dissipation rate of the thermal load 44 rapidly varies in use such that the fuel management system 500 is required to handle transient spikes in the cooling demand of the thermal load 44.

The fuel demand of the combustor 16 corresponds to a flow rate of fuel which is required to be burned (i.e. combusted) by the combustor 16 in order to operate the combustor 16 at an operational setpoint (i.e. the burn flow rate as referred to herein). An operational setpoint of the combustor 16 may be related to a quantity of thrust demanded from the gas turbine engine by, for example, an electronic fly-by-wire control system. The quantity of thrust demanded (i.e. the thrust demand) may vary continuously and/or discretely while the fuel management system 500 is in use, and so the fuel demand of the combustor 16 (and therefore the flow rate of the burn portion of fuel) may vary continuously and/or discretely while the fuel management system 500 is in use.

In view of the discussion above, it follows that the total flow rate of fuel in the supply line is dependent on both the fuel demand of the combustor 16 and on the cooling demand of the thermal load 44. As discussed above, the heat exchanger 540 may be disposed on the recirculation line 511 upstream of the engine-located fuel tank 560 as shown in FIG. 4. If so, a flow rate of the burn portion of fuel corresponds to the fuel demand of the combustor 16, whereas a flow rate of the excess portion of fuel corresponds to the cooling demand of the thermal load 44. The total flow rate of fuel in the fuel supply line 510 is a sum of the burn flow rate and the flow rate of the excess portion of fuel.

Otherwise, as mentioned above, the heat exchanger 540 may be disposed on the fuel supply line 510 between the mixing point 514 and the recirculation point 512. If so, the total flow rate of fuel in the fuel supply line 510 may be determined by whichever of the fuel demand and the cooling demand requires the larger flow rate of fuel. It may be that the burn flow rate is greater than a flow rate required to meet the cooling demand, such the excess portion of fuel is zero or minimal. Otherwise, it may be that the flow rate to meet the cooling demand is greater than the burn flow rate required to meet the fuel demand of the combustor 16, such that there is a non-zero excess portion of fuel.

A ratio of fuel received by the fuel supply line 510 from the external source 41 to fuel received from the engine located fuel tank 560 can be controlled by the input control valve 580.

The total flow rate of fuel within the fuel supply line 510 may be a function of the operation of one or more pumps of the fuel management system, and so control of fuel flow in the fuel management system may be performed by acting on the one or more pumps accordingly. It may be that the total flow rate of fuel in the fuel supply line 510 (i.e. between the mixing point 514 and the recirculation point 512) is dependent only on operation of a pump on the fuel supply line 510, for example the combustor pump 530. For example, certain types of pumps (e.g. positive displacement pumps) may only permit a limited flow rate therethrough when operating at a respective speed. Otherwise, it may be that the total flow rate of fuel in the fuel supply line is dependent on operation of two or more pumps. For example, the flow rate may additionally depend on operation of an external source pump 536 which may be provided upstream of the mixing point for conveying fuel from the external source 41 to the fuel management system 500; and/or on a pump 534 on the recirculating line 511 for returning fuel to the fuel supply line. For example, as shown in FIG. 4 there may be an engine-located fuel tank pump 534 associated with the engine-located fuel tank 560 and configured to convey fuel from the engine-located fuel tank 560 to the mixing point.

Accordingly, a controller of the fuel management system 500 may control the or each pump respectively to target or maintain a total flow rate of fuel in the fuel supply line, as will be further described below.

Similarly, while the example of FIG. 4 includes an input control valve 580 which can be controlled to control how much fuel is drawn from the external source 41 and from the engine-located fuel tank 560 respectively, in variants of this example this mixing could additionally or alternatively be controlled by control of the respective pumps. For example, it may be that there is an engine-located fuel tank pump 534 within or associated with the engine-located fuel tank 560 (e.g. between the engine-located fuel tank 560 and the mixing point 514), and an external source pump 536 provided upstream of the mixing point 514 along the fuel supply line 510, such as between the system inlet 520 and the mixing point 514 (as shown in the example of FIG. 4). In such examples, the engine-located fuel tank pump 534 and/or the external input pump 536 may be controlled (e.g. by a controller of the fuel management system) to target or maintain both a total flow rate of fuel within the fuel supply line 510 between the mixing point 514, and also a target mixing of fuel from the external source 41 and from the recirculation line 511.

As described above, the cooling demand corresponds to a flow rate of fuel which is required to be passed through the heat exchanger 540 in order to provide a sufficient rate of heat rejection from the thermal load 44 to fuel at the heat exchanger 540. This may be dependent on a temperature of fuel entering the heat exchanger 540.

In use, a temperature of fuel received by the fuel supply line 510 from the external source 41 may be different to a temperature of fuel received by the fuel supply line 510 from the recirculation line 511 (e.g. from the engine-located fuel tank 560). In particular, the temperature of fuel received by the fuel supply line 510 from the external source 41 may be generally higher than the temperature of fuel received by the fuel supply line 510 from the engine-located fuel tank 560.

The temperature of fuel received by the fuel supply line 510 from the external source 41 may be dependent on a variety of factors which are unable to be controlled by the fuel management system 500. For example, it may be that the external source 41 is provided by an airframe-located fuel tank of an aircraft in which the gas turbine engine 10 is incorporated. If so, the temperature of fuel received by the fuel supply line 510 from the external source 41 may be dependent on an ambient temperature when the airframe-located fuel tank was provided with fuel. Further, the airframe itself may utilise fuel stored within the airframe-located fuel tank as a coolant/heat sink for cooling of various thermal loads of the airframe. Accordingly, the temperature of fuel stored within the airframe-located fuel tank may increase during flight as a result of heat rejection from the airframe into fuel within the airframe-located fuel tank.

In some practical examples to illustrate how fuel may be received at different temperatures from different sources, it is worth noting that a temperature of fuel received by the fuel supply line 510 from the external source 41 may be 30° C. or more above an ambient temperature (i.e. the temperature of an external air flow around the gas turbine engine), for example 70° C. or more.

On the other hand, the temperature of fuel received by the fuel supply line 510 from the recirculation line 511 is either the temperature of fuel stored within the engine-located fuel tank 560, or if the tank 560 is bypassed (as will be discussed below), it is the temperature of fuel being recirculated. In turn, the temperature of fuel recirculating in the recirculation line and being provided to the engine-located fuel tank 560 is dependent on a temperature to which the cooling device (e.g. ram-air heat exchanger) 570 is able to cool the excess fuel in the recirculation line 511. A temperature of ram air provided to the ram-air heat exchanger is approximately equal to the ambient temperature of the gas turbine engine 10. Therefore, the fuel cooling device 570 may be configured to cool the excess fuel within the recirculation line 511 to a lower temperature than the fuel in the external source 41, for example within a cooled range of up to about 10° C. above the ambient temperature.

In use, it may be that a temperature of fuel received from the fuel cooling device 570 is different to a temperature of fuel within the engine-located fuel tank 560. In particular, it may be that the temperature of fuel within the engine-located fuel tank 560 is lower than the temperature of fuel leaving the fuel cooling device 570. This may occur when the thermal dissipation rate of the thermal load 44 is relatively large and/or has been subject to a sharp increase (i.e. during a transient spike in the cooling demand of the thermal load 44). Under such conditions, relatively warm fuel from the fuel cooling device 570 is mixed with relatively cool fuel in the engine-located fuel tank 560 which is subsequently flushed through the engine-located fuel tank 560 and received into the fuel supply line 510.

Because of a fuel storage capacity of the engine-located fuel tank 560, mixing relatively warm fuel from the fuel cooling device 570 with relatively cool fuel within the engine-located fuel tank 560 results in only a gradual increase in the temperature of fuel within the engine-located fuel tank 560. It follows that a temperature of the fuel flushed through the engine-located fuel tank 560 does not sharply increase in response to a sharp increase in the temperature of fuel received from the fuel cooling device 570. Consequently, an impact of the transient spike in the cooling demand of the thermal load 44 on the temperature of fuel within the fuel supply line 510 is effectively dampened by the mixing of fuel within the engine-located fuel tank 560 and the subsequent mixing of fuel from the engine-located fuel tank 560 and the external source 41 at the mixing point 514. Accordingly, fuel supplied to the fuel supply line 510 may originate from multiple sources each having different associated temperatures, including from the external source 41, from the engine-located fuel tank 560, and from a tank bypass flow of recirculating excess fuel that bypasses the engine-located fuel tank 560 (as will be described further below). A controller of the fuel management system may therefore control the temperature of fuel entering the heat exchanger 540 by selectively controlling the source(s) of the fuel and/or the mixing between different sources respectively.

As the fuel supply line 510 is configured to selectively receive fuel the external source 41 and/or from the engine-located fuel tank 560, the temperature of fuel received by the fuel supply line 510 may selectively be lower than if the fuel supply line 510 were only configured to receive fuel from the external source 41. Accordingly, compared with previously-considered systems, the fuel management system 500 may therefore be better able to accommodate transient spikes in the cooling demand of the thermal load 44 by selectively using relatively-lower temperature fuel, instead of attempting to meet such a cooling demand by significantly increasing fuel flow rates. As may be appreciated, an alternative solution of significantly increasing fuel flow rates may require larger pumps or increase an operating pressure of the fuel management system, which may be associated with additional system complexity and cost. Further, in contrast to previously-considered systems, transient spikes in the cooling demand may be adequately handled without requiring fuel to be returned to the external source 41 via a fuel management system outlet. Therefore, a need for interfacing apparatus between the gas turbine engine 10 and the airframe 40 may be reduced, which may increase an ease of installation of the gas turbine engine 10.

The fuel management system 500 of FIG. 4 further comprises a fuel flow controller 590 configured to receive a cooling signal relating to a cooling demand of the thermal load 44. The fuel flow controller 590 is configured to control fuel flow in the fuel management system 500 based on at least the cooling signal in order to meet the cooling demand of the thermal load 44. As shown in FIG. 4, in this example the heat exchanger 540 is disposed on the recirculation line 511 upstream of the engine-located fuel tank 560, and the fuel flow controller 590 is configured to control the combustor pump 530 and the combustor valve 550 so as to vary the flow rate of the excess portion of fuel and thereby meet the cooling demand of the thermal load 44. In particular, the fuel flow controller 590 is configured to control the combustor pump 530 and the combustor valve 550 so as to increase the flow rate of the excess portion of fuel and thereby meet the cooling demand of the thermal load 44.

In this example, the fuel flow controller 590 is further configured to receive a burn signal relating to a fuel demand of the combustor 16. The fuel flow controller 590 is configured to control fuel flow in the fuel management system 500 based on the cooling signal and the burn signal in order to meet both the cooling demand of the thermal load 44 and the fuel demand of the combustor 16. For example, the fuel flow controller 590 may be configured to control the combustor pump 530 so as to vary the total flow rate of fuel in the supply line in order to meet the cooling demand of the thermal load 44, and to simultaneously control the combustor valve 550 to vary the flow rate of the burn portion of fuel in order to meet the fuel demand of the combustor 16. As noted above, the controller may control the total flow rate in the supply line, the burn flow rate and/or the flow rate of excess fuel in various ways to meet the cooling demand and fuel demand, which may depend on the particular location of the heat exchanger (e.g. whether the heat exchange is located on the recirculation line 511 as shown in FIG. 4, or on the fuel supply line).

In the example of FIG. 4, the thermal load 44 comprises a process fluid circuit 545 which is configured to circulate a process fluid through the heat exchanger 540. The process fluid circuit 545 is configured to reject heat from the process fluid therein to fuel within the heat exchanger 540. As an example, the thermal load 44 may include a gearbox 30 of the gas turbine engine. The process fluid may be, for example, a lubricant provided to the gearbox 30 of the gas turbine engine.

The cooling signal may relate to an operating state of the thermal load 44. For example, if the thermal load 44 comprises a gearbox 30 of the gas turbine engine, the operating state of the thermal load 44 may be determined based on an operating speed of the gearbox 30, an operating mode of the gearbox 30, a temperature of a lubricant flow for the gearbox 30 (e.g. as recovered from the gearbox) and/or an operating throughput power of the gearbox 30.

The cooling signal may relate to a temperature of the process fluid at a process fluid temperature monitoring location of the process flow circuit 545. The process fluid circuit 545 may comprise a process fluid temperature sensor 594 configured to monitor the temperature of the process fluid at the process fluid temperature monitoring location of the process fluid circuit 545 and configured to provide the cooling signal to the fuel flow controller 590, wherein the cooling signal relates to the temperature of the process fluid at the process fluid temperature monitoring location.

The fuel flow controller 590 may control the combustor pump 530 to vary flow through the heat exchanger 540 to maintain the temperature of the process fluid at the process fluid temperature monitoring location within a target temperature range of a process fluid temperature setpoint, or to reduce a temperature error between the process fluid temperature setpoint and the temperature of the process fluid at the process fluid temperature monitoring location (e.g. using a PID controller or any other suitable control process).

The fuel management system 500 may further comprise a combustor flow sensor 592 configured to monitor a burn flow rate of the burn portion of fuel. The fuel flow controller 590 may control the combustor pump 530 and the combustor valve 550 so as to vary the flow rate of the burn portion of fuel in order to meet the fuel demand of the combustor 16 based at least on the monitored burn flow rate. The fuel flow controller 590 may control the combustor pump 530 and the combustor valve 550 to vary the flow rate of the burn portion of fuel to maintain the monitored burn flow rate within a target flow rate range of a flow rate of fuel required to match the fuel demand of the combustor 16.

It may be that the fuel demand of the combustor 16 tends to require a lower flow rate of the burn portion of fuel than the flow rate of the total mixed portion of fuel which is required to meet the cooling demand of the thermal load 44. Decentralised control of the fuel flow for the combustor 16 and for cooling the thermal load 44 may be appropriate in such conditions. For example, the fuel management system 500 may comprise a separate burn controller 591 to the fuel flow controller 590, the burn controller 591 being configured to receive the burn signal and to control the combustor valve 550 based on the burn signal in order to match the fuel demand of the combustor 16, without reference to the cooling signal or the cooling demand. In such examples, the fuel flow controller 590 may be configured to act independently of the burn controller 591 and vice versa. Further, the burn controller 591 may be configured to control the combustor valve 550 so as to vary the flow rate of the burn portion of fuel in order to meet the fuel demand of the combustor 16 based on the burn flow rate as monitored by the combustor flow sensor 592.

As noted above, the fuel flow controller 590 may be configured to vary flow rates and/or mixing of fuel from the external source 41 and from recirculation line (including optionally controlling between receipt of fuel from the engine-located fuel tank 560 and from a tank bypass line 517), based on a monitored temperature of fuel in the fuel management system 500, for example based on a temperature of fuel upstream of the heat exchanger 540. To this end, the fuel management system 500 may further comprise a primary fuel temperature sensor 594' configured to monitor a temperature of fuel at a primary fuel temperature monitoring location of the fuel management system 500. In the example of FIG. 4, the primary fuel temperature monitoring location is on the fuel supply line 510 such that the primary fuel temperature sensor 594' is configured to monitor a temperature of fuel within the fuel supply line 510 downstream of the mixing point 514 and upstream of the heat exchanger 540.

However, it will be appreciated that in other examples, the primary fuel temperature monitoring location may be elsewhere, for example on the recirculation line 511 upstream of the heat exchanger 540. The fuel flow controller 590 may receive a signal from the primary fuel temperature sensor 594' relating to the temperature of fuel at the primary fuel temperature monitoring location and may then control the respective flow rates and/or mixing of fuel received into the fuel supply line 510 from the external source 41 and from the recirculation line 511 accordingly (including optionally controlling between receipt of fuel from the engine-located fuel tank 560 or from a tank bypass line 517 around the tank 560), based on the temperature of fuel at the primary fuel temperature monitoring location to meet the cooling demand of the thermal load 44.

For example, the fuel flow controller 590 may be configured to control the input control valve 580 so as to vary the mixing of fuel at the mixing point 514 such that the proportion of fuel received into the fuel supply line 510 from the engine-located fuel tank 560 is increased relative to the proportion of fuel received into the fuel supply line 510 from the external source 41 in response to a determination that the monitored temperature of fuel upstream of the heat exchanger 540 exceeds a threshold fuel temperature value. Because the temperature of fuel received from the external source 41 may be higher than the temperature of fuel received from the engine-located fuel tank 560, increasing the proportion of fuel received form the engine-located collector tank 560 relative to the proportion of fuel received from the external source 41 may reduce the temperature of fuel entering the heat exchanger 540, which in turn increases the rate of heat rejection from the thermal load 44 to the fuel at the heat exchanger 540.

The threshold fuel temperature valve may be predetermined. Otherwise, the threshold fuel temperature value may be dependent on, for example, the cooling demand of the thermal load 44 and/or the flow rate of the total mixed portion of fuel between the mixing point 514 and the recirculation point 512. Accordingly, the threshold fuel temperature value may vary continuously and/or discretely while the fuel management system 500 is in use.

The fuel management system 500 may comprise additional or alternative fuel temperature sensors configured to monitor a temperature of fuel from the external source 41 at a location upstream of the mixing point 514 and/or a temperature of fuel from the engine-located fuel tank 560 at a location upstream of the mixing point 514. The fuel flow controller 590 may receive signals from the additional or alternative fuel temperature sensors relating to the temperature of fuel from the external source 41 upstream of the mixing point 514 and the temperature of fuel from the engine-located fuel tank 560 upstream of the mixing point 514 and may then control the ratio of fuel received into the fuel supply line 510 from the external source 41 and from the engine-located fuel tank 560 based on the respective temperatures of fuel to meet the cooling demand of the thermal load 44.

The engine-located fuel tank 560 is configured to store fuel received from the recirculation line 511 via the fuel cooling device 570 (e.g. the ram-air heat exchanger 570). A flow rate into the fuel tank 560 may be different from a flow rate out of the fuel tank.

In a high-performance mode of the gas turbine engine 10, the cooling demand of the thermal load 44 may be high and the fuel flow controller 590 may be configured to control fuel flow within the fuel management system 500 so that a proportion of fuel which is provided to the fuel supply line 510 from the recirculation line (e.g. from the engine-located fuel tank 560) is relatively higher than in another mode of the engine (e.g. a normal operating mode), for example being provided exclusively from the recirculation line (e.g. from the engine-located fuel tank 560). It may be that the rate of fuel supply from the engine-located fuel tank is typically greater than the rate at which fuel is replenished via the recirculation line 511, such that the engine-located fuel tank 560 progressively drains when operated in this mode. The tank 560 may be sized to correspond to an anticipated duration of a mission event corresponding to the high-performance mode.

It may be that the fuel management system 500 further comprises an engine-located fuel tank sensor 596 configured to monitor a fill parameter relating to a quantity of fuel stored in the engine-located fuel tank 560, as shown in the example of FIG. 4. The engine-located fuel tank 560 may also be provided with an air-exchange valve 562 configured to allow air to pass in and out of the fuel tank during filling and emptying of the tank 560 with fuel. The fill parameter may relate to a volume or a mass of fuel stored within the engine-located fuel tank 560 and/or it may relate to a fraction of a fuel capacity of the engine-located fuel tank 560 which is filled with fuel. The fuel capacity of the engine-located fuel tank 560 defines a maximum quantity of fuel which may be stored within the engine-located fuel tank 560.

When the gas turbine engine 10 is not in the high-performance mode, the fuel flow controller 590 may control fuel flow in the fuel management system 500 such that the quantity of fuel stored within the engine-located fuel tank 560 increases. The fuel flow controller 590 may control fuel flow in the fuel management system 500 based on the monitored fill parameter to target a target fill parameter of the engine-located fuel tank 560 while continuing to meet the cooling demand of the thermal load 44 and/or the fuel demand of the combustor 16 as applicable. For example, the fuel flow controller may control the fuel pump 530 and the combustor valve 550 so as to increase the flow rate of the excess portion of fuel recirculated by the recirculation line 511 so as to increase the quantity of fuel stored in the engine-located fuel tank 560 to target the target fill parameter while continuing to meet the cooling demand of the thermal load 44 and the fuel demand of the combustor 16 in accordance with the control regimes described above.

The target fill parameter corresponds to a target quantity of fuel which is to be stored in the engine-located fuel tank 560 so that, for example, the gas turbine engine may be operated in the high-performance mode for a predetermined time period. In some examples, the target fill parameter may correspond to the fuel capacity of the engine-located fuel tank 560 such that when the target fill parameter is met, the engine-located fuel tank 560 is completely filled with fuel. Further, the fuel capacity of the engine-located fuel tank 560 may be chosen such that the engine-located fuel tank 560 is able to supply fuel to the fuel supply line 510 for a time period which is sufficiently long so as to enable the gas turbine engine 10 to operate in a high-performance mode for the predetermined period of time.

As discussed above, it may be that the fuel management system 500 comprises a tank bypass line 517 configured to receive fuel from the fuel cooling device 570 and to bypass the engine-located fuel tank 560, such that fuel passing through the tank bypass line 517 may be provided to the mixing point 514 on the fuel supply line 510 without having passed through the engine-located fuel tank 560. The tank bypass line 517 extends from a tank bypass point 518 on the recirculation line 511 between the fuel cooling device 570 and the engine-located fuel tank 560. Accordingly, the fuel supply line 510 is configured to receive fuel from the external source 41 and from the recirculation line 511. The fuel supply line 510 may receive fuel directly from the engine-located fuel tank 560 or from the tank bypass line 517 when receiving fuel from the recirculation line 511.

The tank bypass line 517 is provided with a tank bypass valve 584 which is capable of varying a flow rate of fuel received from the fuel cooling device 570 into the tank bypass line 517. Fuel received from the fuel cooling device 570 into the tank bypass line 517 may be referred to as a tank bypass portion of fuel. The tank bypass portion of fuel is derived from the excess portion of fuel, such that the flow rate of the tank bypass portion of fuel can never exceed the flow rate of the excess portion of fuel.

The fuel management system 500 may further comprise a bypass controller 593 configured to control the tank bypass valve 584 so as to vary the tank bypass flow rate of fuel based on the monitored fill parameter. For example, it may be that the bypass controller 593 is configured to control the tank bypass valve 584 so as to increase the tank bypass flow rate of fuel to be equal to the flow rate of the excess portion of fuel in response to a determination that the engine-located fuel tank 560 is full based on the monitored fill parameter. Alternatively, in such circumstances the bypass controller may not bypass the fuel tank, and fuel may pass into and out of the fuel tank at the same rate.

It may be that the fuel flow controller 590 comprises the bypass controller 593 such that the fuel flow controller 590 performs the above functions of the bypass controller 593. If so, the fuel flow controller 590 may be additionally configured to control the tank bypass valve 584 to control the flow rate of the tank bypass portion of fuel based on the cooling demand of the thermal load 44.

The engine-located fuel tank sensor 596 may be further or otherwise configured to monitor the temperature of fuel within the engine-located fuel tank 560. In addition, the fuel management system 500 may comprise a secondary fuel temperature sensor 594" configured to monitor a temperature of fuel at a secondary fuel temperature monitoring location of the fuel management system 500. The secondary fuel temperature monitoring location is on the recirculation line 511 downstream of the fuel cooling device 570 and upstream of the engine-located fuel tank 560 (and upstream of the tank bypass point 518) such that the secondary fuel temperature sensor 594" is configured to monitor the temperature of fuel leaving the fuel cooling device 570.

As described above, in use it may be that the temperature of fuel received from the fuel cooling device 570 is different to the temperature of fuel within the engine-located fuel tank 560. The fuel flow controller 590 may control the flow rate of the tank bypass portion of fuel to vary the temperature of fuel received into the fuel supply line 510 depending on the cooling demand of the thermal load.

As an example, in response to a determination that the temperature of fuel within the engine-located fuel tank 560 is greater than the temperature of fuel leaving the fuel cooling device 570 and that the cooling demand of the thermal load 44 is not currently being met, the fuel flow controller 590 may control the tank bypass valve 584 to increase the flow rate of the tank bypass portion of fuel and thereby reduce the temperature of fuel received into the fuel supply line 510 in order to meet the cooling demand of the thermal load 44.

As another example, in response to a determination that the temperature of fuel within the engine-located fuel tank 560 is greater than the temperature of fuel leaving the fuel cooling device 570 and that the cooling demand of the thermal load 44 is currently being met, the fuel flow controller 590 may control the tank bypass valve 584 to reduce the flow rate of the tank bypass portion of fuel (and therefore increase the flow rate of fuel through the engine-located fuel tank 560) so as to flush the engine-located fuel tank 560 with relatively cool fuel and thereby reduce the temperature of fuel within the engine-located fuel tank 560, provided that the cooling demand of the thermal load 44 remains met. This effectively increases a store of cooling capacity within the fuel management system 500 in the form of relatively cool fuel within the engine-located fuel tank 560 until it is determined to be needed.

As an additional example, in response to a determination that the temperature of fuel within the engine-located fuel tank 560 is lower than the temperature of fuel leaving the fuel cooling device 570 and that the cooling demand of the thermal load 44 is currently being met, the fuel flow controller 590 may control the tank bypass valve 584 to increase the flow rate of the tank bypass portion of fuel and thereby increase the temperature of fuel received into the fuel supply line 510, provided that the cooling demand of the thermal load 44 remains met while the relatively-low temperature fuel in the engine-located fuel tank 560 remains stored therein. This may effectively preserve the store of cooling capacity within the fuel management system 500 in the form of relatively cool fuel within the engine-located fuel tank 560 until it is determined to be needed as well as preventing fuel stagnation and/or fuel lacquering within the recirculation line 511. As a further example, in response to a determination that the temperature of fuel within the engine-located fuel tank 560 is lower than the temperature of fuel leaving the fuel cooling device 570 and that the cooling demand of the thermal load 44 is not currently being met, the fuel flow controller 590 may control the fuel pump 530, the combustor valve 550 and/or tank bypass valve 584 so as to control the flow rate of fuel being flushed through the engine-located fuel tank 560. The fuel flow controller 590 may control a flow rate of fuel being flushed through the engine-located fuel tank 560 so as to control the temperature of fuel within the fuel supply line 510 and thereby continue to meet the cooling demand of the thermal load 44. Because mixing relatively warm fuel from the fuel cooling device 570 with relatively cool fuel within the engine-located fuel tank 560 results in only a gradual increase in the temperature of fuel within the engine-located fuel tank 560, causing fuel to be flushed through the engine-located fuel tank 560 may extend the period of time for which the store of cooling capacity in the form of relatively cool fuel within the engine-located fuel tank 560 may be used to dampen the impact of transient spikes in the cooling demand of the thermal load 44.

The fuel management system 500 may comprise a cooling device bypass line 517' configured to bypass the fuel cooling device 570, such that fuel passing through the cooling device bypass line 517' may be provided to the engine-located fuel tank 560 without having passed through the fuel cooling device 570. The cooling device bypass line 517' extends from a cooling device bypass point 518' on the recirculation line 511 upstream of the fuel cooling device 570.

The cooling device bypass line 517' is provided with a cooling device bypass valve 584' which is capable of varying a flow rate of fuel received from the recirculation line 511 into the cooling device bypass line 517'. Fuel received into the cooling device bypass line 517' may be referred to as a cooling device bypass portion of fuel. The cooling device bypass portion of fuel is derived from the excess portion of fuel, such that the flow rate of the cooling device bypass portion of fuel can never exceed the flow rate of the excess portion of fuel.

In use, it may be that the fuel cooling device 570 is unable to reject heat from the excess portion of fuel within the recirculation line 511 into a heat sink. For example, when the fuel cooling device 570 is provided by a ram-air heat exchanger 570, it may be that the ambient temperature of the flow of ram-air is sufficiently high that the excess flow of fuel passing through the ram-air heat exchanger 570 would be heated by the flow of ram-air. Under such conditions, the cooling device bypass line 517' enables at least a fraction of the excess portion of fuel to be provided to the engine-located collector tank 560 without having been heated by the fuel cooling device. This may aid preservation of the store of cooling capacity within the fuel management system 500 in the form of relatively cool fuel within the engine-located fuel tank 560.

Otherwise, it may be that the fuel cooling device 570 is likely to overcool the excess portion of fuel within the recirculation line 511 in use. For example, when the fuel cooling device 570 is provided by a ram-air heat exchanger 570, it may be that the temperature of ram air provided to the ram-air heat exchanger is sufficiently low such that solid frozen crystals form within the excess portion of fuel passing through the ram-air heat exchanger 570. For example, the fuel may comprise water which may form ice crystals if the fuel cooling device overcools the excess portion of fuel within the recirculation line 511 in use. Under such conditions, the cooling device bypass line 517' enables at least a fraction of the excess portion of fuel to be provided to the engine-located collector tank 560 without having been cooled by the fuel cooling device 570. This may deter the formation of blockages within the recirculation line 511 as a result of overcooling of the excess portion of fuel.

The fuel management system 500 may further comprise a reheat fuel supply line 515 which is configured to supply fuel from the fuel supply line 510 to the reheat 43 of the gas turbine engine 10 via the recirculation line 511. In the example of FIG. 4, the reheat fuel supply line 515 extends from a reheat branching point 516 on the recirculation line 511 to the reheat 43 via a reheat pump 532 and a reheat control valve 582. The reheat fuel supply line 515 is generally configured to extract a reheat portion of fuel from the recirculation line 511 and to provide the reheat portion of fuel to the reheat 43 of the gas turbine engine. In the example of FIG. 4, a flow rate of the reheat portion of fuel is maintained by the reheat pump 532 and the reheat control valve 582. However, it will be appreciated that in other examples, the flow rate of the reheat portion of fuel is maintained by the reheat control valve 582 alone. The fuel management system 500 may also further comprise a reheat controller 595 configured to receive a reheat signal relating to a fuel demand of the reheat 43. The reheat controller 595 may be additionally configured to control the reheat pump 532 and/or the reheat control valve 582 to control the flow rate of the reheat portion of fuel supplied to the reheat 43 in order to meet the fuel demand of the reheat 43 based on at least the reheat signal.

The fuel management system 500 may further comprise a reheat flow sensor 598 configured to monitor a flow rate of the reheat portion of fuel. That is to say that the reheat flow sensor 598 is configured to monitor the flow rate of fuel passed to the reheat 43 by the reheat control valve 582. The reheat controller 595 may then control the reheat pump 532 and/or the reheat control valve 582 in order to meet the fuel demand of the reheat 43 based at least on the monitored flow rate of the reheat portion of fuel. The reheat controller 595 may control the reheat pump 532 and/or the reheat control valve 582 to vary the flow rate of fuel provided to the reheat 43 and thereby maintain the monitored flow rate of the reheat portion of fuel within a target flow rate range of a flow rate of fuel required to meet the fuel demand of the reheat 43.

It may be that the fuel flow controller 590 comprises the reheat controller 595 such that the fuel flow controller 590 performs the above functions of the reheat controller 595. If so, the fuel flow controller 590 is configured so that control of fuel flow within the fuel management system 500 is to simultaneously meet the cooling demand of the thermal load 44, the fuel demand of the combustor 16 and the fuel demand of the reheat 43.

By providing the reheat fuel supply line 515 branching from the recirculation line 511, the flow rate and/or pressure of the reheat portion fuel provided to the reheat 43 may be controlled independently of the flow rate and/or pressure of the burn portion of fuel which is provided to the combustor 16.

Figure 5:
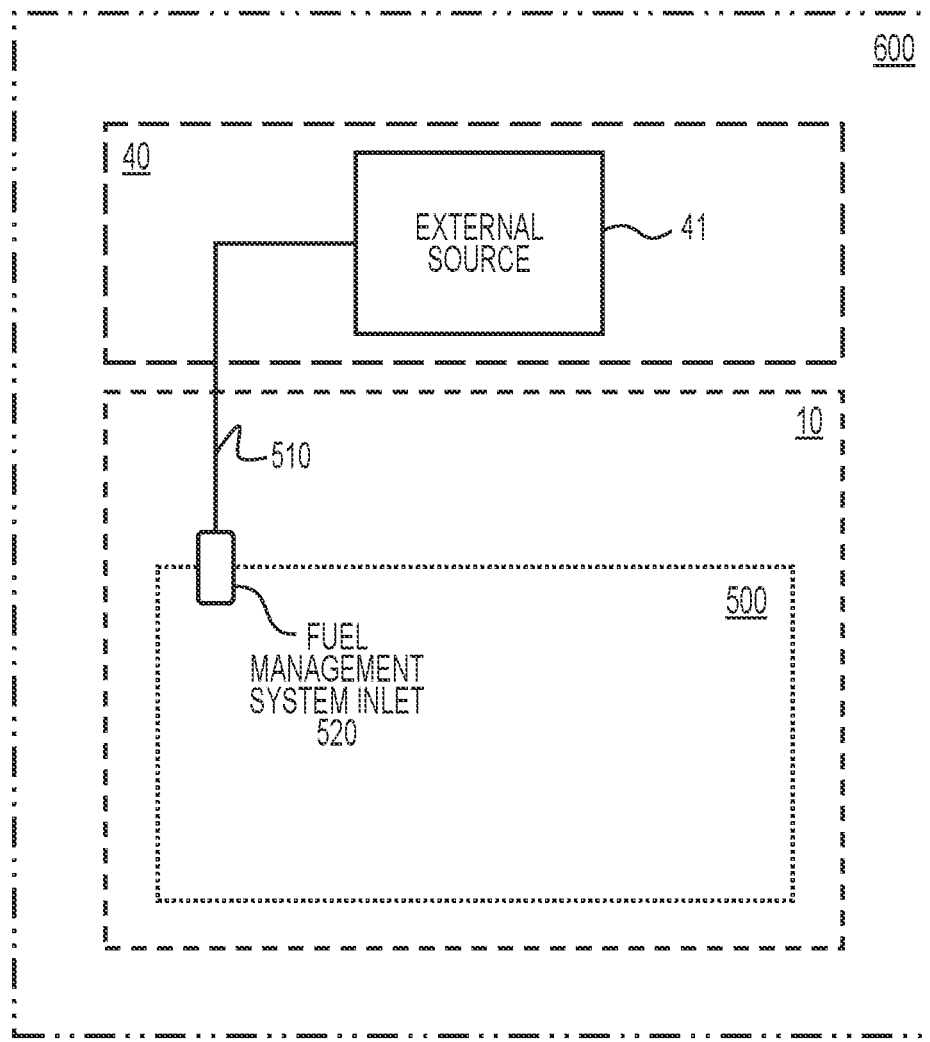
FIG. 5 shows a schematic view of a gas turbine engine comprising a fuel management system.

FIG. 5 shows an aircraft 600 comprising a gas turbine engine 10 and an airframe 40. The gas turbine engine 10 comprises a fuel management system 500 in accordance with the examples described above with respect to FIG. 4. The airframe 40 comprises an airframe-located fuel tank 41 which provides the external source for the fuel supply line 510 via the fuel management system inlet 520.

It may be that a fuel capacity of the airframe-located fuel tank 41 is equal to or greater than the fuel capacity of the engine-located fuel tank 560. As discussed above with respect to FIG. 4, it may be that the fuel capacity of the engine-located fuel tank 560 may be chosen such that the engine-located fuel tank 560 is able to supply fuel to the fuel supply line 510 for a time period which is sufficiently long so as to enable the gas turbine engine 10 to operate in a high-performance mode for the predetermined period of time. The gas turbine engine 10 may be required to operate in the high-performance mode when the aircraft 600 is performing airborne manoeuvres, for example.

Consequently, the fuel capacity of the engine-located fuel tank 560 may be chosen such that the engine-located fuel tank 560 is able to supply fuel to the fuel supply line 510 for a time period which is sufficiently long so as to enable the aircraft 600 to perform various airborne manoeuvres. However, the fuel capacity of the airframe-located fuel tank 41 is greater than or equal to the fuel capacity of the engine-located fuel tank 560 so that the gas turbine engine 10 does not have an excessive mass or installation volume.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed is:

1. A gas turbine engine comprising a combustor and a fuel management system, the fuel management system comprising:
   a fuel supply line configured to supply fuel to the combustor;
   a recirculation line configured to recirculate excess fuel from the fuel supply line to an engine-located fuel tank via a fuel cooling device configured to reject heat from the excess fuel;
   a heat exchanger configured to reject heat from a thermal load of the gas turbine engine to fuel in the fuel management system, wherein the heat exchanger is disposed on the recirculation line;
   wherein the fuel supply line is configured to receive fuel from an external source and from the engine-located fuel tank; and
   a fuel pump on the fuel supply line, wherein the fuel pump is downstream from a mixing point where the excess fuel from the recirculation line flows into the fuel supply line and upstream from a recirculation point where the recirculation line receives the excess fuel from the fuel supply line.

2. The gas turbine engine according to claim 1, further comprising a combustor valve on the fuel supply line configured to control flow of a burn portion of fuel passing through the combustor valve to the combustor, wherein the combustor valve is disposed on the supply line so that a remaining portion of fuel flowing in the supply line is directed into the recirculation line.

3. The gas turbine engine according to claim 2, further comprising a burn controller configured to:
   receive a burn signal relating to a fuel demand of the combustor; and
   control the combustor valve to meet the fuel demand based on the burn signal.

4. The gas turbine engine according to claim 1, further comprising a fuel flow controller configured to:
   receive a cooling signal relating to a cooling demand of the thermal load;
   control fuel flow in the fuel management system based on the cooling signal to meet the cooling demand.

5. The gas turbine engine according to claim 4, wherein the thermal load comprises a process flow circuit configured to reject heat from a process fluid to fuel within the heat exchanger; and wherein the cooling signal relates to a temperature of the process fluid at a temperature monitoring location of the process flow circuit.

6. The gas turbine engine according to claim 4, wherein the fuel flow controller is configured to receive a burn signal relating to a fuel demand of the combustor;
   and wherein the fuel flow controller is configured so that the control of the fuel flow in the fuel management system is based on at least the cooling signal and the burn signal to meet the cooling demand and the fuel demand, and wherein control of fuel flow in the fuel management system includes controlling a combustor valve.

7. The gas turbine engine according to claim 6, further comprising a combustor flow sensor configured to monitor a burn flow rate of the burn portion of fuel;
- wherein the fuel flow controller is configured so that the control of the fuel flow in the fuel management system to meet the fuel demand is based on the monitored burn flow rate.

8. The gas turbine engine according to claim 6, wherein the fuel flow controller:
- comprises a reheat controller, and
- is configured so that the control of the fuel flow in the fuel management system is to meet the cooling demand of the thermal load, the fuel demand of the combustor, and a fuel demand of a reheat.

9. The gas turbine engine according to claim 4,
- wherein the fuel flow controller is configured so that the control of the fuel flow in the fuel management system includes controlling the fuel pump.

10. The gas turbine engine according to claim 4, further comprising an input control valve configured to control mixing of fuel received into the fuel supply line from the external source and from the engine-located fuel tank.

11. The gas turbine engine according to claim 10, wherein the fuel flow controller is configured so that the control of the fuel flow in the fuel management system to meet the cooling demand includes controlling the input control valve to vary mixing of fuel received into the fuel supply line from the external source and from the engine-located fuel tank.

12. The gas turbine engine according to claim 4, further comprising:
- a sensor configured to monitor a fill parameter relating to a quantity of fuel stored in the engine-located fuel tank;
- wherein the fuel flow controller is configured so that the control of the fuel flow in the fuel management system includes controlling the fuel pump and the combustor valve based on the monitored fill parameter to target a target fill parameter while continuing to meet the cooling demand.

13. The gas turbine engine according to claim 12, further comprising:
- a tank bypass line configured to receive fuel from the fuel cooling device and bypass the engine-located fuel tank; and
- a bypass controller configured to control a tank bypass valve provided to the tank bypass line so as to vary a tank bypass flow rate of fuel received from the fuel cooling device and bypassing the engine-located fuel tank based on the monitored fill parameter;
- wherein the fuel supply line is configured to receive fuel from: the external source and the recirculation line, and to selectively receive fuel from the engine-located fuel tank via the recirculation line.

14. The gas turbine engine according to claim 1, further comprising:
- a reheat fuel supply line extending from the recirculation line to a reheat of the gas turbine engine to extract a reheat portion of fuel; and
- a reheat controller configured to control a reheat supply valve on the reheat fuel supply line to control a flow rate of the reheat portion of fuel supplied to the reheat based on a reheat signal relating to a fuel demand of the reheat.

15. The gas turbine engine according to claim 14, wherein the reheat fuel supply line is downstream from the recirculation point and upstream of the heat exchanger.

16. An aircraft comprising the gas turbine engine of claim 1, and an airframe, wherein the airframe comprises an airframe-located fuel tank which provides the external source for the fuel supply line.

* * * * *